(12) United States Patent
Yokomizo et al.

(10) Patent No.: US 6,797,292 B2
(45) Date of Patent: Sep. 28, 2004

(54) METHOD FOR PRODUCING MEAL CONTAINING MANNOSE

(75) Inventors: Futoshi Yokomizo, Izumisano (JP); Takashi Kadota, Izumisano (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 10/250,452

(22) PCT Filed: Dec. 26, 2001

(86) PCT No.: PCT/JP01/11476

§ 371 (c)(1),
(2), (4) Date: Oct. 31, 2003

(87) PCT Pub. No.: WO02/052947

PCT Pub. Date: Jul. 11, 2002

(65) Prior Publication Data

US 2004/0071823 A1 Apr. 15, 2004

(30) Foreign Application Priority Data

Dec. 27, 2000  (JP) ........................................ 2000-399200

(51) Int. Cl.⁷ ................................................ A23K 1/16
(52) U.S. Cl. .......................... 426/52; 426/640; 426/456
(58) Field of Search .............................. 426/52, 53, 61, 426/640, 456, 463; 435/99, 100, 105

(56) References Cited

U.S. PATENT DOCUMENTS 6,376,220 B1 * 4/2002 Yokomizo .................... 435/105

FOREIGN PATENT DOCUMENTS

| EP | 0 960 568 A1 | 12/1999 | ............ A23K/1/16 |
|----|---|---|---|
| GB | WO 95/17103 | 6/1995 | ............ A23K/1/14 |
| JP | 8-173055 | 7/1996 | ............ A23K/1/16 |
| JP | 11-137288 | 5/1999 | ............ C12P/19/14 |
| JP | 2000-245357 | * 9/2000 | ............ A23K/1/16 |
| JP | 2000-270890 | 10/2000 | ............ C12P/19/14 |

* cited by examiner

*Primary Examiner*—Keith Hendricks
(74) *Attorney, Agent, or Firm*—Kenneth Sonnenfeld; Michael Willis; Morgan & Finnegan, L.L.P.

(57) ABSTRACT

A method for producing meal containing mannose, wherein powder particles containing cellulose and/or hemicellulose is mixed with the wet composition obtained by having a mannnan degrading enzyme function to Arecaceae plant-derived meals such as copra meal and/or palm kernel meal followed by the drying process. Production rate of mannose is increased by causing reaction under high level of water content, in addition to which drying efficiency is increased by mixing hygroscopic fiber materials to the wet composition, an enzymic reactant, and thus meal containing mannose can be produced with high efficiency and good economical performance.

9 Claims, 3 Drawing Sheets

F I G. 1
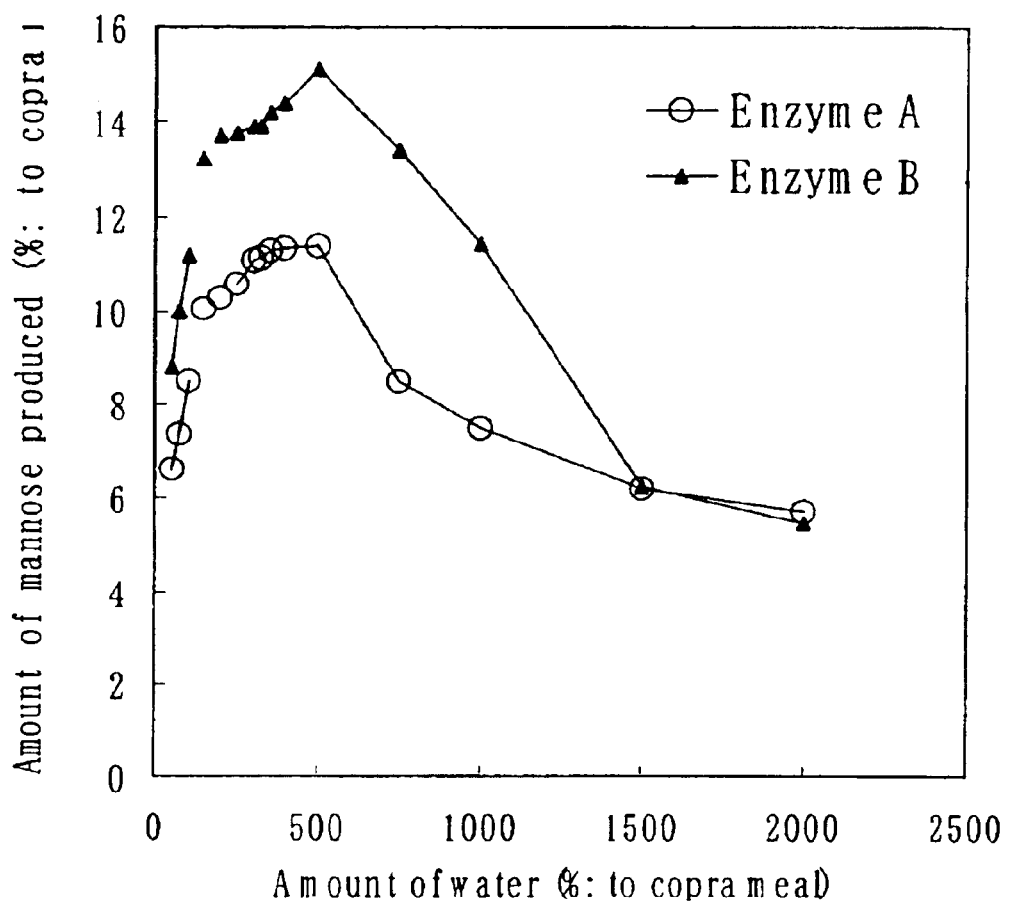

US 6,797,292 B2

METHOD FOR PRODUCING MEAL CONTAINING MANNOSE

TECHNICAL FIELD

The present invention relates to a method for producing meal containing mannose as the feedstuff additive, which is effective for preventing infection caused by bacteria, especially by Salmonella.

PRIOR ARTS

Addition of mannose to feedstuff has conventionally and expectantly been known to have the effect of excreting Salmonella from animals fed with the feefstuff (Poultly Science 1989 68 1357). It has also been known that Arecaceae plant-derived meals such as copra meal or palm kernel meal etc. abundantly contain mannan and the followings are disclosed. To produce mannoses including mannose by having an enzyme function to mannan solution obtained from such as copra meal (residue remaining after Arecaceae oil extraction), E. melanococca GAERTN called Corozo, Phytelephas macrocarpa, and the like (Japanese Laid-Open Patent Application No.1988-49093). To use substance in order to improve the taste of feedstuff, which substance is obtained by enzymic decomposition of palm kernel meal etc. for oligosaccharide production (PCT/GB94/02802). To produce mannose or mannose polisaccharides through hydrolytic reaction caused by having an enzyme (solution) function to the materials including galactomannans such as copra meal, after which the reactive solution is extracted and dried by such as spray-drying (Japanese Laid-Open Patent Application No.1995-236429, Japanese Laid-Open Patent Application No.1996-173055).

These methods, however, have problem in the extraction efficiency for mannose. Using a large amount of water leads to high efficiency, while it costs a lot for drying.

It, therefore, tends to be believed that when the reactant, which is directly dried after the enzymic reaction without any extraction process, is used for feedstuff or feedstuff additives, only a small amount of water used for the reaction is to be deleted, which displays good economical performance without any loss of mannose during the extraction. Such ideas have actually been filed for patent applications (Domestic Re-Publication of PCT International Publication (for Patent Application) No.99-08544, etc.), but are extremely difficult to carrying it out. Post-reaction meal contains considerably high level of monosaccharides, so that it becomes sticky as water evaporates in the process of drying. It causes considerable adhesion to the inner wall of the dryer, which makes the continual operation difficult and leads to decrease in the producing ratio. In addition, mannose is heat-decomposed due to the long drying period, so that the mannose finally obtained is far below the expectations. The inventors thus have begun to look from the different viewpoint and sought for a method using the post-reaction meal without drying, and they have filed the application for method wherein the post-reaction meal is mixed with dried powder particle and then water in the post-reaction meal is diffused over the dried powder particle (Japanese Laid-Open Patent Application No.2000-245357). But the problems have not totally been resolved since there arise other problems such as growth of mold caused by uneven mixing, rise in the cost of storage and distribution resulting from increase in the volume of feedstuff, and the like.

As mentioned above, problems lie in the drying process for obtaining meal containing mannose that the production ratio is low or that the manufacturing cost is expensive, which is reflected in the high cost of products. Therefore, when the sufficient level of meal containing mannose, which is the level substantially effective for the prevention of Salmonella, is added to feedstuff, the price will exceed the adequate price in the poultry market.

Taken the situations together, the market requires a method to provide mannose as the feedstuff additive at lower price.

SUMMARY OF THE INVENTION

The present inventors and others have made keen studies to solve the problems mentioned above. And they have found that by mixing and drying copra meal or palm kernel meal, which does not react to the wet composition obtained by having a mannnan degrading enzyme function to Arecaceae plant-derived meals such as copra meal or palm kernel meal, feedstuff containing mannose can be effectively produced. Here the present invention has completed. The invention, therefore, focuses on a method for producing mannose-containing feedstuff, wherein powder particles containing cellulose and/or hemicellulose is mixed with the wet composition obtained by having a mannnan degrading enzyme function to Arecaceae plant-derived meals such as copra meal or palm kernel meal, followed by the drying process.

BRIEF DESCRIPTION OF THE DRAWINGS

FIG. 1 is a graph showing the function of amounts of water and the mannose production. (The preliminary test)

EXAMPLE 1

Figure 2:
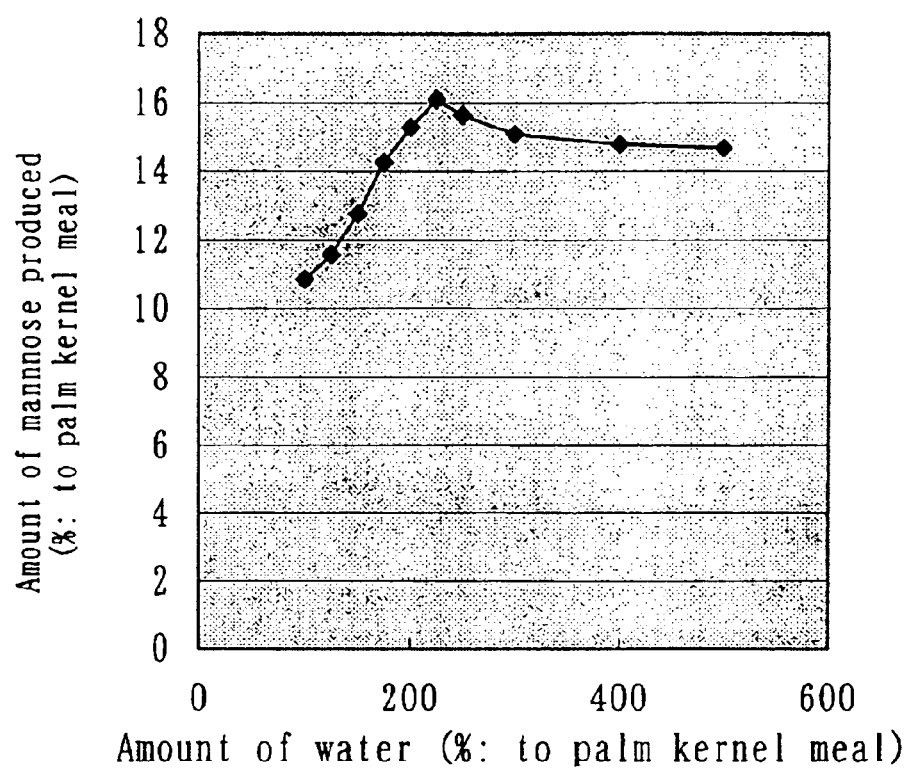
FIG. 2 is a graph showing the function of amounts of water and the mannose production. (The preliminary test)

The Best Mode for Carrying out the Invention

Arecaceae plant-derived meal is a residue remaining after the oil extraction from Arecaceae plants. Arecaceae plants include Cocos nucifera, Elaeis guineensis, E. melanococca GAERTN, A. funifera MART., Orbignya martiana BARB.-RODR., all of which contain mannan. Among these, Cocos nucifera and Elaeis guineensis are especially essential and their oil is pressed on an industrial scale. Copra meal is produced as a residue remaining after the coconut oil is pressed from copra, the albumen of Cocos nucifera (expelled copra meal) or even as a residue remaining after the coconut oil extraction using solvents (extracted copra meal). Copra meal itself is utilized as the feedstuff for animals. It contains copra mannan at the ratio of 25–32%, the hydrolysis of which through enzymic treatment leads to the considerable production of mannose or its oligosaccharide, thus the effect of eliminating Salmonella can be expected. Copra meal to be used in the invention will not specifically be limited in the terms of place of origin of the material copra, manufacturing degree, oil content, particle size, etc., so any copra meal may be used. The water content of expelled copra meal or extracted copra meal that are normally easy to be obtained is about 4–8 weight %.

Palm kernel meal is a residue remaining after the oil (palm kernel oil) is taken from the albumen (palm kernel) of Elaeis gunineensis fruits planted mainly in Malaysia, Indonesia, and Nigeria, and is widely used as the feedstuff material and the like. Palm kernel meal is classified, according to the methods of taking oil, into compressed residue (compressed palm kernel meal: oil content: 6–12%) and residue after the extraction (extracted palm kernel meal: oil content: 2% or under) where oil is further extracted using solvents from the compressed residue, both of which may be used in the present invention. Palm kernel meal contains about 29–38 weight % of mannan, and like copra meal, a great amount of mannose or its oligosaccharides can be produced through hydrolysis.

Any kind of mannnan degrading enzyme may be used as long as it hydrolyze copra mannan such as mannanase, mannosidase, hemicellulase, etc. While those that are Aspergillus niger-derived and are commercially available such as Hemicellulase GM "AMANO"/Amano Pharmaceutical (trade name), Sumizyme ACH/Shin Nihon Chemical (trade name), Cellulosin GM5/Hankyu Bioindustry (trade name) are the preferable examples. Other than these, those commercially available as xylanase or cellulase, for instance, Cellulase Y-NC/Yakult Pharmaceutical (trade name), Sumizyme AC/Shin Nihon Chemical (trade name) with the above-mentioned hydrolytic activity may be used.

Mannnan degrading enzymes function to Arecaceae plant-derived meals as the enzymic solution that is dissolved/dispersed in water, but the adjustment of water content of the reaction systems (meal, mannnan degrading enzyme, and water) is important in order to cause the reaction effectively. Sufficient amount of water makes fiber in meals swell sufficiently, so that the enzymic solution may easily become in contact with mannan. To make this occur, more than 100–1000 parts by weight of water to 100 parts by weight of copra meal as said Arecaceae plant-derived meals, and more than 50–600 parts by weight of water to 100 parts by weight of palm kernel meal as said Arecaceae plant-derived meals are preferably to be mixed respectively.

However, when more water than needed is mixed, enzyme concentration will dilute as a consequence, so that not only the reaction efficiency lowers but cost for drying in the following drying process increases. Taken together, therefore, adequate amount of water added is, preferably 125–500 parts by weight to 100 parts by weight of copra meal when using copra meal, and 75–400 parts by weight to 100 parts by weight of palm kernel meal where 100–300 parts by weight are more preferable, respectively. It is simple and preferable to adjust water amount of the reaction systems as described above, by adjusting the water amount of the enzymic solution that is to be functioned to meals.

The wet composition is obtained by keeping the mixture, consisting of Arecaceae plant-derived meal, mannnan degrading enzyme and water, which is prepared to meet the water content condition as described above, at the optimal temperature for the enzymes. In said wet composition, Mannose or mannosides (mannobiose, mannotriose, mannooligosaccharides) are generated with the amounts corresponding to the reaction time and the enzyme amount used. Around 10–30 parts by weight of mannose are produced to 100 parts by weight of the material Arecaceae plant-derived meal when the reaction takes place for 72 hours, while the mannose amount depends on the enzyme amount used.

Next, powder particles containing cellulose and/or hemicellulose is mixed with the above wet composition. Said powder particles may be anything that contains less water than the wet composition and that is harmless to add to feedstuff. The examples include, Arecaceae plant-derived meals such as copra meal, palm kernel meal and the like, konjac tobiko (the powder blown off in the process of grinding dried Amorphophalus konjac), soya bean hull, defatted rice bran, bran, rice screening bran, etc. Among these, copra meal, palm kernel meal, mannose-containing copra meal, or mannose-containing palm kernel meal, with the water content of 10% or under, are preferable for use in that they contain lots of hygroscopic fiber as well as being actually used as the feedstuff. The dried meal containing mannose obtained by the method of the present invention may be used as said mannose-containing copra meal and mannose-containing palm kernel meal. And when said dried meal containing mannose is used, the water content of the mixture before drying is adjustable preferably and the mannose concentration of the product can be higher. In order to control the mannose content in the final product and to avoid the adhesion to the inner wall of the dryer that occurs in the drying process, as described later, preferentially, ordinary copra meal or palm kernel meal that does not contain mannose is adequate to be used.

Adequate amounts of powder particles to be mixed is 10–300 parts by weight, preferably 40–200 parts by weight, to 100 parts by weight of the raw material meal as substance of the reaction. When less than 10 parts by weight is mixed, the effects of the present invention may not satisfyingly be accomplished, such as suppressing adhesion to the inner wall of the dryer and increasing the drying efficiency. When over 300 parts by weight are used, said effects will not display more efficiency than a certain level. The post-reaction wet composition contains 50–90 weight % of water. When enzyme-treated copra meal and/or enzyme-treated palm kernel meal are used as the powder particles to be mixed to said wet composition, the preferable amount to be mixed is such to keep the water content to be 50 weight % or under. Meanwhile, when untreated copra meal and/or palm kernel meal is used as the powder particles, the preferable amount is such to keep the water content 70 weight % or under.

The mixture is then dried to the required water content (for example, 10 weight % or under). Although methods for drying are not limited, flash drying such as fluidized-bed drying may be applied, with a relatively simple equipment which is advantageous in terms of application cost. As a result of suppressing adhesion to the wall of the dryer equipment and shortening the drying time, loss caused by the heat-decomposition of mannose obtained by the enzyme treatment can be minimized. In addition, conventional techniques have limited water content in the enzymic reaction to a low level perhaps because cost for drying was considered, but it has turned out to be disadvantageous with regard to the efficiency of enzymic reaction. The present invention increases the drying efficiency, and together with the fact that water content in the enzymic reaction systems can be adjusted to somewhere around the optimal value for the reaction efficiency, it enables to carry out highly efficient method for producing meal containing mannose.

Thus obtained dried meal contains 5–10 weight % of mannose, and addition of said dried meal at the level of 0.1–1.0 weight % to the feedstuff will prevent Salmonella infection. The present invention will be exemplified below and will be explained in details. But the scope of the invention will not be limited to the following examples. Part and % referred to in the examples mean the baseline of weight.

Preliminary Test

1/6 g each of β-galactomannanase (Hemicellulase GM "AMANO") and xylanase (Hemicellulase "AMANO" 90/Amano Pharmaceutical (trade name)) were dissolved into water of varying amounts from 5 g to 200 g, and were mixed with 10 g of expelled copra meal (water content: 5%). After which, the mixtures were placed in sealed containers and kept at 60° C. for 72 hours for reaction. The produced mannose after the reaction was determined as follows. About 0.5 g of the reactant was exactly weighed and to which water was added up to 100 ml. The mixture was filtered to separate liquid phase and was treated when necessary such as deproteinizing, then was subjected to anion exchange chromatography (equipment: DX500, column used: Carbo Pac PA1, detector: Pulsed Amperometoric Detector/either of which is Dionex products). Subsequently, the enzyme was replaced to Cellulase Y-NC/Yakult Pahrmaceutical (trade name) and tested in a similar manner. The results obtained are shown in Table 1 and FIG. 1. The mannose production keeps on increasing when water used is up to 500% of the copra meal. This is attributed to the process that fibroid material contained in copra meal absorbs water and swells so that it can sufficiently contact with the enzyme and mannan, as a substrate, in copra meal. In addition, when the more water is used, the less mannose is produced on the contrary. The reason is thought to be that the concentration of the enzyme that contacts with mannan decreases since water can no longer be kept by the fiber of copra meal. Regarding the above, amount of water used is necessarily to be 100 to 1000% of copra meal for the efficient decomposition of copra meal and the maximum production of mannose. Further, compressed palm kernel meal (oil content: 6.5%, water contents: 5.1%) was also tested as mentioned above using cellulase Y-NC. The results are shown in Table 2 and FIG. 2.

TABLE 1

Water used for the reaction and the mannose production

| Amount of water | Amount of mannose produced | |
|---|---|---|
| | Enzyme A | Enzyme B |
| 50 | 6.62 | 8.78 |
| 75 | 7.34 | 9.99 |
| 100 | 8.50 | 11.20 |
| 125 | | |
| 150 | 10.03 | 13.21 |
| 175 | | |
| 200 | 10.28 | 13.72 |
| 225 | | |
| 250 | 10.57 | 13.74 |
| 300 | 11.08 | 13.93 |
| 325 | 11.15 | 13.89 |
| 350 | 11.29 | 14.19 |
| 400 | 11.32 | 14.40 |
| 500 | 11.39 | 15.10 |
| 750 | 8.51 | 13.41 |
| 1000 | 7.51 | 11.42 |
| 1500 | 6.23 | 6.24 |
| 2000 | 5.69 | 5.48 |

Enzyme A: Hemicellulase GM "AMANO" + Hemicellulase "AMANO" 90
Enzyme B: Cellulase Y-NC
All the values are the ratio to 100 parts of copra meal.

TABLE 2

Water used for the reaction and the mannose production

| Amount of water | Amount of mannose produced Enzyme B |
|---|---|
| 100 | 10.87 |
| 125 | 11.59 |
| 150 | 12.78 |
| 175 | 14.26 |
| 200 | 15.30 |
| 225 | 16.10 |
| 250 | 15.65 |
| 300 | 15.09 |
| 400 | 14.79 |
| 500 | 14.67 |

Enzyme B: Cellulase Y-NC
All the values are the ratio to 100 parts of palm kernel meal.

EXAMPLE 1

Figure 3:
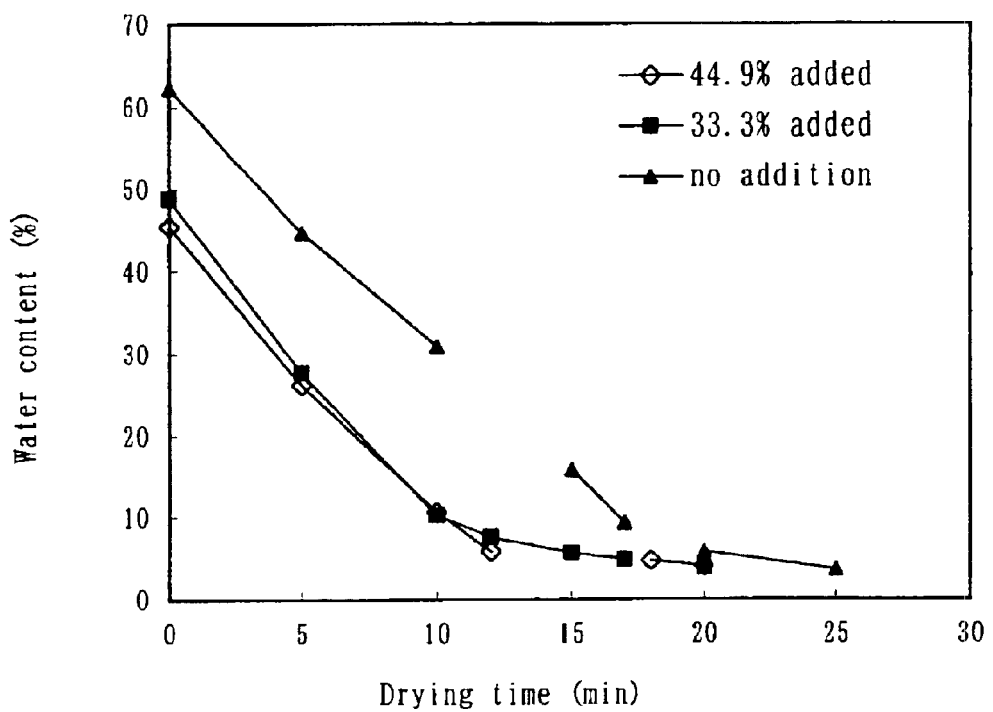
FIG. 3 is a graph showing the function of the drying time and water.

⅙ part each of β-galactomannanase (hemicellulase GM "AMANO") and xylanase (hemicellulase "AMANO" 90) were respectively dissolved into water of 150 parts and mixed with 100 parts of expelled copra meal. The mixtures were then placed in sealed containers and kept at 60° C. for 72 hours for reaction. Like in the preliminary test, after the reaction, the amount of mannose was determined and 250 parts of reactant (wet component) including 9.9 parts of mannose were obtained. Dried reactant (water content: 8.22%, mannose content: 10.3%) was added to the reactant at the ratio of 33.3% and 45%, followed by drying and comparing the working properties. A dryer used was Batch oscillating fluidized-bed dryer, MDBV-600 (Fuji Paudal), which was operated with the inlet air of 70° C. and the blow of 5–7 m3/min. Water content of the dried product was targeted to be 9% or under. The results are shown in Tables 3, 4, and 5, along with FIG. 3. The data values in the graph shown in FIG. 3 are as follows. Drying time (min) and water content (time, %) when 44.9% is added=(0, 45.50), (5, 26.20), (10, 10.60), (12, 5.89), (18, 4.76), (20, 4.11), when 33.3% is added (time, %)=(0, 48.80), (5, 27.74), (10, 10.26), (12, 7.65), (15, 5.74), (17, 4.90), (20, 3.94), without addition (time, %)=(0, 62.30), (5, 44.71), (10, 30.97), (15, 15.85), (17, 9.36), (20, 5.92), (25, 3.70)

TABLE 3

| Sec. | Powder particles added (%) to reactant/ to material meal | Dose (Kg) | Drying time (min) | Water content before drying (%) | Water content after drying (%) | Mannose content after drying (%) see note) |
|---|---|---|---|---|---|---|
| 1 | 0/0 | 1.6 | 20 | 62.3 | 5.92 | 9.20 |
| 2 | 33.3/83.3 | 1.8 | 12 | 48.8 | 7.65 | 10.30 |
| 3 | 45/112.5 | 1.8 | 12 | 45.5 | 5.89 | 10.40 | note)
dry matter base (content in the solid without water).

TABLE 4

| Sec. | Throughput (Kg/time) | Throughput for the reactant (Kg/time) | Water evaporated (Kg/time) |
|---|---|---|---|
| 1 | 4.8 | 4.8 | 2.9 |
| 2 | 9.0 | 6.8 | 4.0 |
| 3 | 9.0 | 6.2 | 3.8 |

TABLE 5

| Sec. | Amount of Mannose in the dried material Note 1) (Kg/time) | Ratio of Mannose in the reactant (%) Note 2) | Working situation |
|---|---|---|---|
| 1 | 0.17 | 88 | about 90% of the dried material aggregated with lots of adhesion to the inner wall of the dryer. Difficult to handle. |
| 2 | 0.26 | 98 | little aggregation and adhesion. |

TABLE 5-continued

| Sec. | Amount of Mannose in the dried material Note 1) (Kg/time) | Ratio of Mannose in the reactant (%) Note 2) | Working situation |
|---|---|---|---|
| 3 | 0.25 | 100 | little aggregation and adhesion. |

Note 1) content originally contained in the powder particle is not reflected in the result.
Note 2) Values compared before and after the drying process at dry matter base.

As shown in Table 4, throughput was observed to increase by adding powder particles to the reactant. Further, addition of the powder particles to the reactant prevented the decomposition and chemical combination of mannose caused by heat, as the drying process completes in a short period of time. Thus, increase of the mannose ratio was observed (Table 5).

EXAMPLE 2

⅙ part each of β-galactomannanase (Hemicellulase GM "AMANO") and xylanase (hemicellulase "AMANO" 90) were respectively dissolved into water of 125 parts and mixed with 100 parts of expelled copra meal. The mixtures were then placed in sealed containers and kept at 60° C. for 72 hours for reaction. Like in the preliminary test, the post-reaction mannose production was determined and 225 parts of the reactant including 9.4 parts of mannose were obtained. Dried reactant (water content 7.80%, mannose content, 9.60%) or copra meal untreated with enzyme (water content, 6.00%) was added to the reactant at the ratio of 33.3%, that were then dried and their working properties were compared. The dryer used was the Micron dryer MDV-1 (The Hosokawa Micron Group), a continual direct heating flash dryer. The drying condition was 150° C. inlet air and 85° C. outlet air.

TABLE 6

| Sec. | Powder particles added (%) to the reactant (100%) | Powder particles added (parts) to the copra meal as the reaction material (100 parts) | Dose (Kg) | Drying time (min) | Water content before drying (%) | Water content after drying (%) | Mannose content after drying (%) |
|---|---|---|---|---|---|---|---|
| 4 | 0 | 0 | 12.26 | 16 | 55.6 | 12.9 (discontinued) | 8.57 |
| 5 | 33.3 Note 1) | 74.9 | 11.93 | 15 | 43.7 | 4.70 | 9.90 |
| 6 | 33.3 Note 2) | 74.9 | 19.96 | 20 | 43.2 | 3.30 | 6.12 |

Note 1) Dried copra meal treated with enzyme
Note 2) Copra meal untreated with enzyme

TABLE 7

| Sec. | Throughput (Kg/time) | Throughput for the reactant (Kg/time) | Water evaporated (Kg/time) |
|---|---|---|---|
| 4 | (discontinued) | (discontinued) | (discontinued) |
| 5 | 47.7 | 35.8 | 19.5 |
| 6 | 59.9 | 44.9 | 24.8 |

TABLE 8

| Sec. | Mannose in the dried products (kg/time) Note 1) | Mannose ratio in the reactant (%) Note)2 | Working situation |
|---|---|---|---|
| 4 | 1.75 | 86 | Adhesion to the inner wall of the dryer increased and the operation was discontinued because of the overload. Difficult to handle. |
| 5 | 1.61 | 101 | Adhesion to the inner wall was 5% or under of the dried product. |
| 6 | 2.09 | 104 | No aggregation nor adhesion |

Note 1) Content originally contained in the powder particles is not reflected in the result.
Note 2) Values compared before and after the drying process at dry matter base.

When powder particles were not added, adhesion to the inner wall of the dryer was increased, which led to the discontinuation of operation because of the overload to the crusher. Also, the mannose ratio in the product was low. Contrarily, addition of powder particles to the reactant suppressed adhesion to the inner wall of the dryer, which increased the ratio of mannose as well as enabling the continual operation.

EXAMPLE 3

0.11 and 0.26 parts of β-galactomannanase (Hemicellulase GM "AMANO") and cellulase (Cellulase Y-NC) were respectively dissolved into water of 350 parts and mixed with 100 parts of expelled copra meal. The mixtures were then placed in sealed containers and kept at 60° C. for 72 hours for reaction. Like in the preliminary test, the post-reaction mannose production was determined and 450 parts of the reactant including 16.1 parts of mannose were obtained. Copra meal untreated with enzyme (water content: 4.45%) was added to the reactant with the amounts of 30% and 40% of said reactant, after which they were dried and their working properties were compared. A batch fluidized-bed dryer (Okawara MFG.) was used. The drying condition was inlet air of 70° C.

TABLE 9

| Sec. | Untreated copra meal added (%) to the reactant (100%) | Untreated copra meal added (part) to copra meal as the reactant material (100 parts) | Dose (Kg) | Drying time (min) | Water content before drying | Water content after drying | Mannose content after drying (%) |
| --- | --- | --- | --- | --- | --- | --- | --- |
| 7 | 0 | 0 | impossible | — | 78.5 | — | — |
| 8 | 30 | 135 | 2.34 | 15 | 61.4 | 7.65 | 7.50 |
| 9 | 40 | 180 | 2.52 | 17 | 57.4 | 7.80 | 6.43 |

TABLE 10

| Sec. | Throughput (kg/time) | Throughput for the reactant (kg/time) | Water evaporated (kg/time) |
| --- | --- | --- | --- |
| 7 | — | — | — |
| 8 | 9.4 | 7.2 | 5.5 |
| 9 | 8.9 | 6.4 | 4.8 |

TABLE 11

| Sec. | Mannose in the dried products (kg/time) Note 1) | Mannose ratio in the reactant (%) Note 2) | Working situation |
| --- | --- | --- | --- |
| 7 | — | — | Unable to put into the dryer because of high water content. |
| 8 | 0.27 | 104 | Little aggregation and adhesion. |
| 9 | 0.24 | 106 | Little aggregation and adhesion. |

Note 1) Content originally contained in the powder particles is not reflected in the result.
Note 2) Values compared before and after the drying process at dry matter base.

The level of water content for the reaction was so high that it was unable to directly put into the dryer. As the preliminary test revealed, the reaction under high water content increased mannose production, however, on the other hand, drying became difficult. As shown in this example, the drying process was enabled to carry out by decreasing the primary level of water content by adding and mixing powder particles.

EXAMPLE 4

1/6 part of cellulase (Cellulase Y-NC) was dissolved into water of 125 parts and mixed with 100 parts of expelled copra meal which was also used in the preliminary test. The mixture was then placed in a sealed container and kept at 60° C. for 72 hours for reaction. Subsequently, the amount of water used for lysis was changed to 200 parts and the reaction was caused likewise. Like in the preliminary test, the post-reaction mannose production was determined and 225 and 300 parts of the reactants respectively including 12.6 and 15.8 parts of mannose were obtained. The former reactant was added the dried reactant (water content: 3.24%, mannose content: 12.20%) at 30.0% of the reactant. The latter reactant was added normal palm kernel meal (water content: 5.51%) at 27.0%. These mixtures were dried and were compared the working properties. Batch fluidized-bed dryer (Okawara MFG.) was used, with the drying condition of 70° C. inlet air.

TABLE 12

| Sec. | Powder particles added (%) to the reactant (100%) | Powder particles added (part) to copra meal as the reaction material (100 parts) | Dose (Kg) | Drying time (min) | Water content before drying (%) | Water content after drying (%) | Mannose content after drying (%) |
| --- | --- | --- | --- | --- | --- | --- | --- |
| 10 | 0 | 0 | 1.80 | 36 | 57.2 | 6.69 | 10.85 |
| 11 | 30 Note 1) | 67.5 | 2.34 | 18 | 44.7 | 7.59 | 12.40 |
| 12 | 0 | 0 | impossible | — | 68.0 | — | — |
| 13 | 27 Note 2) | 81.0 | 2.29 | 18 | 54.7 | 3.80 | 8.57 |

Note 1) Dried palm kernel meal containing mannose.
Note 2) Palm kernel meal.

TABLE 13

| Sec. | Throughput (kg/time) | Throughput for the reactant (kg/time) | Water evaporated (kg/time) |
|---|---|---|---|
| 10 | 3.0 | 3.0 | 1.6 |
| 11 | 7.8 | 6.0 | 3.1 |
| 12 | — | — | — |
| 13 | 7.6 | 6.0 | 4.0 |

TABLE 14

| Sec. | Mannose in the dried products (kg/time) Note 1) | Mannose ratio in the reactant (%) Note)2 | Working situation |
|---|---|---|---|
| 10 | 0.14 | 86 | About 90% of the dried product was aggregated with lots of Adhesion to the inner wall of the dryer. Difficult to handle. |
| 11 | 0.32 | 99 | Little aggregation and adhesion. |
| 12 | — | — | Unable to put into the dryer because of the high level of water content. |
| 13 | 0.30 | 97 | No aggregation nor adhesion. |

Note 1) Content originally contained in the powder particles is not reflected in the result.
Note 2) Values compared before and after the drying process at dry matter base.

As shown in Table 13, addition of the powder particles to the reactant increased the throughput. Further, addition of the powder particle to the reactant shortened the drying process, which prevented decomposition and chemical combination of mannose caused by heat and ends up with the increase of the ratio. Still further, when the level of water content for the reaction was very high, it was impossible to directly put into the dryer. The preliminary test has already proved that mannose production increases when subjected to reaction with water content of high level. However, on the other hand, drying process became difficult. Drying was enabled to carry out by decreasing the level of primary water by adding and mixing the powder particles as this example demonstrates.

INDUSTRIAL APPLICABILITY

In the present invention, copra meal or palm kernel meal are mixed, that do not react to the wet composition obtained by having a mannnan degrading enzyme function to Arecaceae plant-derived meals such as copra meal, palm kernel meal, and the like followed by the drying process. As a result, throughput increases where adhesion to the inner wall of the dryer is avoided and the continual operation becomes possible. In addition, drying process completes in a short period of time so that mannose decomposition and chemical combination caused by heat can be prevented as well as mannose ratio increases. Thus the present invention enables to produce feedstuff containing mannose efficiently and economically.

What is claimed is:

1. A method for producing meal containing mannose, wherein a wet composition, obtained by adding a mannan-degrading enzyme to Arecaceae plant-derived meals, and powder particles containing cellulose and/or hemicellulose, are mixed and dried.

2. A method for producing meal containing mannose according to claim 1, wherein Arecaceae plant-derived meals are copra meal and/or palm kernel meal.

3. A method according to claim 1, wherein powder particles to be mixed that contain cellulose and/or hemicellulose are 10–300 parts by weight to 100 parts by weight of Arecaceae plant-derived meals that are materials for the wet composition.

4. A method according to claim 1, wherein powder particles to be mixed that contain cellulose and/or hemicellulose is copra meal and/or palm kernel meal.

5. A method according to claim 4, wherein copra meal and/or palm kernel meal to be mixed are untreated with a mannan-degrading enzyme.

6. A method for producing meal containing mannose, wherein 100 parts by weight of copra meal is mixed with a mannan-degrading enzyme and 100–1000 parts by weight of water, the thus obtained wet composition treated with a mannan-degrading enzyme is mixed with powder particles containing cellulose and/or hemicellulose, followed by drying.

7. A method according to claim 6, wherein the amount of water to be mixed is 125–500 parts by weight.

8. A method for producing meal containing mannose, wherein 100 parts by weight of palm kernel meal is mixed with a mannan-degrading enzyme and 50–600 parts by weight of water, the thus obtained wet composition treated with a mannnan degrading enzyme is mixed with powder particles containing cellulose and/or hemicellulose, followed by drying.

9. A method according to claim 8, wherein the amount of water to be mixed is 75–400 parts by weight.

* * * * *